3,515,685
MANUFACTURE OF CHROMIA
ALUMINA CATALYSTS
John C. Hayes, Palatine, and Roy T. Mitsche, McHenry, Ill., assignors to Universal Oil Products Company, Des Plaines, Ill., a corporation of Delaware
No Drawing. Filed Sept. 1, 1967, Ser. No. 664,932
Int. Cl. B01j 11/06
U.S. Cl. 252—465                                    3 Claims

ABSTRACT OF THE DISCLOSURE

The manufacture of a spherical chromia-alumina catalytic composite. Aluminum is digested in an acidic solution of a compound of chromium and the resulting mixture dispersed as droplets in a hot oil bath.

BACKGROUND OF THE INVENTION

Composites comprising chromia and alumina have been widely employed as catalysts, or as a component of catalysts, to effect a variety of hydrocarbon conversion reactions including dehydrogenation, dehydrocyclization, etc., and also in the reforming of gasolines and naphthas to improve their anti-knock character.

Apart from the catalytic effect of the components themselves, the physical properties of the catalyst such as surface area, pore volume, pore diameter, density, etc., have a considerable influence on the activity, selectivity, and stability of the catalyst for a particular reaction. Even minor variations in physical properties may provide unexpected and substantial differences in the efficiency or utility of a catalyst for a given reaction. It is therefore of considerable importance that the method of catalyst preparation affords adequate means for controlling the physical properties of the catalyst composite and the discovery of new techniques of preparation is highly significant in the advancement of the catalyst art.

Processes employing chromia-alumina composites as catalysts or components thereof generally comprise a fixed bed type of operation. This type of operation must frequently contend with variations in pressure drop across the catalyst bed, and with channeling of the reactants through the catalyst bed which, in effect, amounts to a portion of the catalyst being by-passed. These and other deficiencies of a fixed bed operation are substantially obviated by utilizing spherically shaped catalyst particles which permit a more uniform packing of the catalyst bed.

The manufacture of alumina spheres by methods affording control of physical properties of the spherical alumina products have been disclosed in the art. For example, see U.S. Pat. No. 2,620,314, issued to James Hoekstra. In the manufacture of chromia-alumina spheres it would appear to be a simple matter to impregnate pre-formed alumina spheres of desired physical properties by conventional impregnation techniques. However, it has been observed that the amount of chromia which can be suitably composited with alumina in this manner is generally not in excess of about 40 weight percent and composites comprising in excess of about 15 weight percent chromia usually require two or more impregnations. It will be appreciated that each succeeding impregnation further alters the physical properties of the catalyst composite. Thus, the control of physical properties achieved in the manufacture of the alumina spheres is substantially negated. Further, uniformity or homogeneity of the chromia-alumina composite is not achieved.

It is an object of this invention to present a novel method of preparing a spherical chromia-alumina catalytic composite. It is another object to present a method of preparation whereby higher levels of chromia can be incorporated in the chromia-alumina composite. It is a further object of this invention to achieve a uniform dispersion of chromia in a chromia-alumina catalytic composite. It is a more specific object to present a method of preparing a chromia-alumina composite which lends itself to control of the physical properties of the chromia-alumina product.

SUMMARY OF THE INVENTION

In one of its broad aspects the present invention embodies a method of preparing a spherical chromia-alumina composite which comprises digesting aluminum in an acidic solution of a compound selected from the group consisting of the oxides and halides of chromium, commingling the resultant sol with an ammonia precursor which is decomposable to ammonia with time and temperature and dispersing the mixture as droplets in a hot oil bath, recovering the resultant gel spheres and aging the same at an elevated temperature effecting decomposition of the residual ammonia precursor contained therein, and drying and calcining the same.

In accordance with the present invention, aluminum metal is commingled with an acidic solution of a compound selected from the group consisting of the oxides and halides of chromium, preferably chromium oxide and/or chromium chloride, and digested, and usually at about reflux temperature. In general, the temperature will range from about 175° F. to about 220° F. The time of heating will depend in part on the purity and the particle size of the aluminum employed. The aluminum may be of any available commercial grade and particle size. Very pure aluminum, say of a purity of about 99.99%, reacts relatively slowly to form the desired chromia-alumina hydrosol. However, a suitable reaction rate is accomplished utilizing aluminum turnings, or aluminum in a finely subdivided or powdered form, whereby maximum surface area is exposed to the acidic reactants. On the other hand, the reaction rate is increased substantially by utilizing, a relatively impure aluminum. For example, an aluminum of about 99.0–99.9% purity is considerably more reactive than the very pure aluminum and, where the desired product purity permits, is more suitably employed. Aluminum pellets of about ¼" to about ½" diameter, such as are conveniently prepared by dropping molten aluminum into water, have proven highly satisfactory.

In the preparation of the chromia-alumina hydrosol, the mole ratio of metals (aluminum and chromium) to chloride is preferably maintained at from about 1:1 to about 1.5:1. Ratios other than those prescribed effect premature gelation of the hydrosol and/or the formation of hydrogel spheres which are too soft for further processing. Chromia-alumina hydrogel spheres prepared as herein contemplated tend to undergo less shrinkage during aging and drying as the metals/chloride ratio of the hydrosol is increased. It is therefore desirable to maintain a relatively high ratio to obviate stress and strain in the hydrogel sphere resulting from excessive shrinkage.

The method of this invention permits the manufacture of stable chromia-alumina hydrogel spheres comprising up to about 90 weight percent chromia. Thus, the alumina is digested in an acidic solution comprising an oxide and a chloride of chromium, the oxide and chloride being employed in an amount to establish a desired chromia level in the chromia-alumina end product, and in a ratio to establish the desired metals/chloride mole ratio of the hydrosol.

The chromia-alumina hydrosol is suitably prepared in a diluted state so as to contain from about 8 weight percent to about 20 weight percent metals therein. The chromia-alumina hydrosols with a metal concentration in excess of about 20 weight percent are substantially unstable and tend to set to a gel immediately, particularly upon being commingled with the ammonia precursor, or result in spheres which are brittle and easily cracked. On the other hand, the hydrosols having a metals concentration of less than about 8 weight percent yield soft hydrogel spheres generally unsuitable for further processing.

The chromia-alumina hydrosol prepared in the aforesaid manner is, pursuant to the method of this invention, commingled with an ammonia precursor hereinafter described. The commingling is effected at below gelation temperature, usually less than about 60° F., and the resulting mixture dispersed as droplets into a hot oil bath or suspending medium whereby the droplets are formed into firm hydrogel particles.

A suitable ammonia precursor may be described as a weakly basic material which is substantially stable at normal temperatures but hydrolyzable or decomposable to ammonia with increasing temperature, the rate of hydrolysis increasing with temperature. Certain organic amines, particularly urea, hexamethylenetetramine, and mixtures thereof, are suitable ammonia precursors. Thus, the ammonia precursor can be commingled with the chromia-alumina sol at normal temperatures without effecting any substantial degree of gelation. While gelation of the mixture will occur with time, upon heating the mixture, preferably at a temperature of from about 120° F. to about 220° F., co-gelation of the chromia and alumina is accelerated, the chromia and alumina being set chemically by the gradual release of ammonia from the decomposing ammonia precursor. The ammonia precursor, which is preferably hexamethylenetetramine, is employed in an amount which is dependent upon the anion concentration of the chromia-alumina sol mixture. Thus, the quantity of hexamethylenetetramine or other ammonia precursor is dependent upon the concentration of chloride ion in the hydrosol mixture. The ammonia precursor is utilized in an amount, to furnish upon total decomposition or hydrolysis thereof, from about 1 to about 1.5 equivalents of ammonia per equivalent of anion present in the mixture, in other words, sufficient to effect from 100% to about 150% neutralization.

Only a fraction of the ammonia precursor is hydrolyzed or decomposed to ammonia in the relatively short period during which initial gelation occurs. During the subsequent aging process, the residual ammonia precursor retained in the gel continues to hydrolyze to ammonia and to effect further polymerization of the chromia-alumina whereby improved pore volume-pore diameter relationships of the gel are established. Aging of the gel is suitably accomplished in from about 10 to about 24 hours, preferably in the oil suspending medium at a temperature of from about 120° F. to about 225° F. or more and at a pressure to maintain the water content of the spheres in a substantially liquid phase.

After the aging treatment, the spheres are washed in any suitable manner. A particularly satisfactory method comprises washing the spheres by percolation, either with an upward or downward flow of water, and preferably with water containing a small amount of ammonium hydroxide. After washing, the spheres may be dried at a temperature of from about 200° F. to about 600° F. for from 6 to 24 hours or more, or dried at this temperature and calcined at a temperature of from about 800° F. to about 1500° F. for from about 2 to about 12 hours or more.

As previously stated, the foregoing method affords the convenient means of developing the desired physical properties of the chromia-alumina composite. The method includes a number of process variables which affect the physical characteristics. Generally, the metals/chloride ratio of the hydrosol influences the apparent bulk density of the chromia-alumina product and, correspondingly, the pore volume and pore diameter characteristics attendant therewith, lower ratios tending toward higher apparent bulk densities. Other process variables affecting the physical properties of the composite include the time, temperature and pH at which the chromia-alumina hydrogel particles are aged. Usually temperatures in the lower range and the shorter aging periods tend toward higher apparent bulk densities. Surface area properties are normally a function of calcination temperature, a temperature of from about 800° F. to about 1500° F. being suitably employed. Also, as herein disclosed, the calcination media will have a substantial effect.

The following examples are presented in illustration of a method of this invention and are not intended as an undue limitation on the generally broad scope of the invention as set out in the appended claims.

Example I 192 grams of aluminum pellets were digested in an acidic chromium chloride solution. The acidic solution was prepared by dissolving 700 grams of chromium chloride hexahydrate in 1800 milliliters of water. The digestion was effected in a 2 liter capacity digestion vessel at about 85° C., the reactants being thoroughly stirred. About 8.7 cubic feet of hydrogen was evolved during the course of the digestion reaction. The resultant hydrosol contained about 7.4 weight percent aluminum, 5.2 weight percent chromium, 10.5 weight percent chloride, and had a metals/chloride ratio of about 1.2. The specific gravity of the hydrosol was 1.32.

450 cubic centimeters of the above prepared hydrosol was blended with about 450 cubic centimeters of a 28 weight percent aqueous hexamethylene tetramine solution. This mixture was then emitted as droplets into a forming tower filled with an oil suspending medium maintained at about 194° F. The spherical hydrogel particles were recovered from the bottom of the forming tower and aged in the portion of the oil suspending medium in a separate vessel for a period of 3 hours at a temperature of 175° F. The spheres were further aged in an aqueous ammonia solution, water-washed, dried at 392° F. and calcined in an air atmosphere at 1200° F. for 3 hours.

The calcined 1/16" diameter spherical chromia-alumina product had the following physical properties:

Weight percent $Cr_2O_3$—35.7
Weight percent $Al_2O_3$—65.0
Surface area—156 m.$^2$/gram
Pore volume—0.47 ml./gram.
Pore diameter—121 A.

Example II

Spherical chromia-alumina particles were prepared in substantially the same manner as described in Example I with the exception that the washed and dried product was calcined in a dry nitrogen atmosphere at 1200° F. for 3 hours. The chromia-alumina spheres had the following physical properties:

Weight percent $Cr_2O_3$—35.7
Weight percent $Al_2O_3$—65.0
Surface area—273 m.²/gram
Pore volume—0.5 ml./gram
Pore diameter—79 A.

We claim as our invention:

1. In a method of preparing a chromia-alumina composite, the improvement which comprises:
digesting aluminum in an acidic solution consisting essentially of water and a compound selected from the group consisting of the oxides and halides of chromium.

2. The improvement of claim 1 further characterized in that said aluminum is digested in an acidic solution consisting essentially of water and an oxide and a chloride of chromium in a ratio to yield a sol characterized by a metal/chloride mole ratio of from about 1.0 to about 1.5 and in an amount sufficient to yield a final chromia-alumina composite comprising from about 10% to about 90% chromia.

3. The improvement of claim 2 further characterized in that said oxide and chloride of chromium are utilized in an amount sufficient to yield a final chromia-alumina composite comprising from about 40% to about 90% chromia.

References Cited

UNITED STATES PATENTS

| | | | |
|---|---|---|---|
| 3,340,205 | 9/1967 | Hayes | 252—313 |
| 2,274,633 | 3/1942 | Pitzer | 196—50 |
| 2,843,552 | 7/1958 | Lechthaler | 252—455 |
| 2,807,593 | 9/1957 | Dobres | 252—465 |
| 2,865,866 | 12/1953 | Hoekstra | 252—448 |

OTHER REFERENCES

Kirk-Othmer, Encyc. of Chemical Tech., 1949, vol. I, p. 593, vol. III, p. 945.

DANIEL E. WYMAN, Primary Examiner

P. M. FRENCH, Assistant Examiner